United States Patent
Sahoo et al.

(10) Patent No.: US 10,623,523 B2
(45) Date of Patent: Apr. 14, 2020

(54) DISTRIBUTED COMMUNICATION AND TASK HANDLING TO FACILITATE OPERATIONS OF APPLICATION SYSTEM

(71) Applicant: Oracle International Corporation, Redwood Shores, CA (US)

(72) Inventors: Mohini Mohana Sahoo, Bangalore (IN); Ramasimha Rangaraju, Bangalore (IN); Sharath Kumar Madenahatti Nanjaiah, Mysore (IN); Deepankar Narayanan, Trivandrum (IN); Ravi Shankar, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 103 days.

(21) Appl. No.: 15/983,831

(22) Filed: May 18, 2018

(65) Prior Publication Data
US 2019/0356754 A1    Nov. 21, 2019

(51) Int. Cl.
*H04L 29/08* (2006.01)
*H04L 29/06* (2006.01)

(52) U.S. Cl.
CPC ............ *H04L 67/32* (2013.01); *H04L 65/102* (2013.01); *H04L 67/02* (2013.01); *H04L 69/02* (2013.01)

(58) Field of Classification Search
None
See application file for complete search history.

(56) References Cited

U.S. PATENT DOCUMENTS

| 6,374,336 | B1 * | 4/2002 | Peters | G06F 11/1076 711/167 |
| 6,418,432 | B1 * | 7/2002 | Cohen | G06F 16/951 |
| 6,418,478 | B1 * | 7/2002 | Ignatius | G06F 3/0613 709/201 |
| 7,120,160 | B2 * | 10/2006 | Takase | H04L 49/3045 370/415 |
| 7,209,972 | B1 * | 4/2007 | Ignatius | G06F 3/0613 370/431 |
| 7,310,348 | B2 * | 12/2007 | Trinh | G06F 9/3885 370/419 |

(Continued)

FOREIGN PATENT DOCUMENTS

EP    2693337    2/2014

OTHER PUBLICATIONS

Guzel, Techniques for Mastering cURL, Envatotuts+, Available on Internet at: https://code.tutsplus.com/tutorials/techniques-for-mastering-curl--net-8470, Jan. 8, 2010, 21 pages.

(Continued)

*Primary Examiner* — Backhean Tiv
(74) *Attorney, Agent, or Firm* — Kilpatrick Townsend & Stockton LLP

(57) ABSTRACT

A system is presented to efficiently communication data between a sub-network and a third-party application system, such that the third-party application system is able to perform one or more functions based on data sourced from the sub-network. A process scheduler system is presented to provide multiple communication paths to populate a data store of the third-party application system.

20 Claims, 6 Drawing Sheets

(56) References Cited

U.S. PATENT DOCUMENTS

| | | | |
|---|---|---|---|
| 7,313,140 B2* | 12/2007 | Lakshmanamurthy | H04L 49/90 370/394 |
| 7,352,766 B2* | 4/2008 | Van Asten | H04L 12/5601 370/369 |
| 7,549,151 B2* | 6/2009 | Zhou | G06F 9/544 719/313 |
| 7,716,199 B2* | 5/2010 | Guha | G06F 16/9535 707/706 |
| 7,912,988 B2* | 3/2011 | Boyd | H04L 69/16 709/230 |
| 8,130,074 B2* | 3/2012 | Meirick | H04L 47/14 340/2.23 |
| 8,149,794 B2* | 4/2012 | Shin | H04W 72/0413 370/336 |
| 8,386,455 B2* | 2/2013 | Basu | G06F 16/36 707/706 |
| 8,463,937 B2* | 6/2013 | Bush | H04L 67/32 709/203 |
| 8,559,439 B1* | 10/2013 | Dongare | H04L 47/34 370/394 |
| 8,645,358 B2* | 2/2014 | Wu | G06F 16/9535 707/722 |
| 8,804,751 B1* | 8/2014 | Poole | H04L 49/90 370/229 |
| 9,009,265 B2* | 4/2015 | Zapata | H04L 43/0811 709/219 |
| 9,015,542 B2* | 4/2015 | Jones | G01R 31/318547 714/30 |
| 9,177,274 B2* | 11/2015 | Kramer | G06F 9/4881 |
| 9,208,189 B2* | 12/2015 | Herbrich | G06F 9/5055 |
| 9,454,499 B2* | 9/2016 | Neeb | G06F 13/1673 |
| 9,634,960 B2* | 4/2017 | Beshai | H04L 49/15 |
| 9,696,914 B2* | 7/2017 | Moore | G06F 3/0619 |
| 9,785,546 B2* | 10/2017 | Shen | G06F 12/0246 |
| 9,864,546 B1* | 1/2018 | Kovishaner | G06F 3/0656 |
| 9,886,401 B2* | 2/2018 | Neeb | G06F 13/1673 |
| 10,120,734 B1* | 11/2018 | Doraiswamy | G06F 21/44 |
| 10,235,223 B2* | 3/2019 | Prasad | G06F 9/546 |
| 2004/0260679 A1* | 12/2004 | Best | G06F 16/9535 |
| 2005/0144535 A1* | 6/2005 | Murray | G06F 11/3414 714/47.1 |
| 2007/0043868 A1* | 2/2007 | Kumar | G10L 15/26 709/226 |
| 2007/0061371 A1* | 3/2007 | Bodin | G06F 16/4393 |
| 2007/0150631 A1* | 6/2007 | Druke | B25J 9/1661 710/244 |
| 2011/0145499 A1 | 6/2011 | Ananthanarayanan et al. | |

OTHER PUBLICATIONS

Li et al., Resources-conscious Asynchronous High-speed Data Transfer in Multicore Systems: Design, Optimizations, and Evaluation, Parallel and Distributed Processing Symposium (IPDPS), 2015 IEEE International, Available on Internet at: http://pdfs.semanticscholar.org/41af/fbc76aa04acca6db1af2b4698c717ba1b26a.pdf, May 25-29, 2015, 10 pages.

* cited by examiner

DISTRIBUTED COMMUNICATION AND TASK HANDLING TO FACILITATE OPERATIONS OF APPLICATION SYSTEM

TECHNICAL FIELD

The present disclosure relates to facilitating population of a data store in an application system and subsequently facilitating data-store-based operation performance at the data store.

BACKGROUND

Application servers have long been used to perform multiple operations. Application servers that invoke business logic of a company are typically owned and operated by that company. However, in some instances, it is desirable to integrate at least partial operation of an application server with another system, so as to enhance a performance of another system and/or enhance a performance of the application server. In such, it is desirable to securely and efficiently apply business logic of a third-party application system utilizing a company's internal datasets.

BRIEF SUMMARY

In some embodiments, systems and methods are provided for utilizing different communication paths during a build and use of a data store. To enable at least part of a build of the data store, a process scheduler system can directly transfer data from a sub-network (e.g., managed by a single entity) to an application system. The transfer can occur using a set of handlers, and data can be transmitted asynchronously or synchronously across the handlers. The application system can use the received data to build a data store. Different systems and different communication paths can be used to process request for data-store-based operations. For example, an integration system can receive a request from a web server for the application system to perform one or more operations (e.g., a search operation) based on the built data store. The integration system can encode the request into a format compatible with the application system (e.g., HTTP2.) The integration system can send the encoded request to the application system, and the application system can perform the requested operation using the built data store. The application system can return an operation result to the integration system. The integration system can encode the operation result to be compatible with the web server and can transmit the encoded operation result to the web server. Thus, the network can use two distinct routes for data: one for at least partly building a data store, and one for facilitating a data-store-based operation.

In certain embodiments, one or more datasets stored in a data source may be retrieved and/or received by the process scheduler system. In certain embodiments, the process scheduler system encodes the retrieved data to a particular format, such as to produce a JavaScript Object Notation (JSON) document. The process scheduler can segment the JSON document into a plurality of document segments. Each document segment can be scanned by the process scheduler system to determine if it is associated with an attachment (e.g., a non-text file.) If the document segment is not associated with an attachment, the process scheduler system can assign the document segment to a first group. However, if the document segment is associated with an attachment, the attachment can be retrieved and encoded. The encoded attachments can then be added to their respective document segments, and the document segments can be assigned to a second group.

In certain embodiments, the process scheduler system transmits document segments in the first group to the integration system. The integration system can process at least part of the document segments (e.g., encode part of the data) and subsequently send the document segments to the application system. Meanwhile, the process scheduler system can transmit document segments in the second group directly to the application system. This differential build technique can decrease a time for data transmission from the data source to the application system due to the selective routing of larger data objects through a more efficient path. In some instances, the process scheduler system differentially assigns document segments to the first group and the second group based on another assessment of data. In some instances, the process scheduler system transmits all document segments directly to the application system, regardless of whether an attachment is present or referenced.

The application system can use the received document segments from the first and second group to populate a data store at least partly managed by the application system. The application system can use the data store to perform operations associated with the application system, such as a search operation and/or an operation to perform a processing responsive to a request or interaction detected from a user device. More specifically, a web server can receive the request from the user device or can receive a communication indicative of interaction from the user device. The web server can generate an operation request (e.g., to perform a search) based on the request or interaction and can transmit the operation request to the integration system. The operation request can be in an initial format and/or in conformance with an initial protocol. The integration system can transform the operation request to a target format and/or target protocol (associated with the application system) and can transmit the transformed operation request to the application system. The application system can perform the requested operation and transmit a result back to the integration system, which can transform the result back to the initial format and/or in conformance with the initial protocol. The transformed result can be transmitted to the web server, which may further process the result (e.g., to integrate at least part of the result into a webpage or object) and transmit the further processed result to the user device.

In certain embodiments, the data source, the process scheduler system, and integration system are part of a private network, and the integration system may acts as middleware to connect the private network to a public network. In certain embodiments, the integration system is connected to the web server via a public network, and the application server via a public network.

Thus, techniques are provided for populating a data store in an application system and subsequently facilitating a data-store-based operation performed by the application system. The disclosed methods and systems are an improvement to current data transfer systems and data transfer methods because it allows a data store of an application system to be built without the extensive use of middleware, but subsequently using middleware to facilitate a data-stored-based operation performed by the application system. Thus, various techniques disclosed herein can be advantageous over instances where middleware creates a bottleneck for voluminous and/or large communications between an internal system and an outside system. For example, when handling data, middleware servers may use large amount of Java Virtual Memory to encode, route, and/or format received data. This increase in Java Virtual Memory can throttle other operations of the middleware server and slow down or prevent subsequent data from being received and/or processed. The described methods and systems can thus reduce a middleware bottleneck by enabling datasets to be sent from a process scheduler system directly to an application system without implementing the integration system, but implementing the integration system for facilitation of application system operations. This can reduce the amount of dataflow a middleware server must process, thus reducing the possibility of middleware bottleneck, while also allowing the application system to be protocol agnostic.

Furthermore, separate techniques are provided for populating the data store using larger datasets (e.g., documents with attachments) and populating the data store using smaller data sets (e.g., documents without attachments). The disclosed methods and systems are an improvement to current data transfer systems and data transfer methods because it can bypass middleware and send larger files directly to an application system, which decreases the bottleneck associated with middleware. The described method removes the middleware bottleneck by enabling large datasets to be sent from a process scheduler system directly to a device without implementing a middleware server, while allowing smaller datasets to be sent indirectly to the device via the middleware server. This reduces the amount of dataflow a middleware server must process, thus reducing the possibility of middleware bottleneck. In addition, because process scheduler system can direct most of its resources to processing and transmitting larger datasets, data may be sent quicker and more efficiently to the application system than if all data was sent to the application system via a middleware server.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Network Overview

Figure 1:
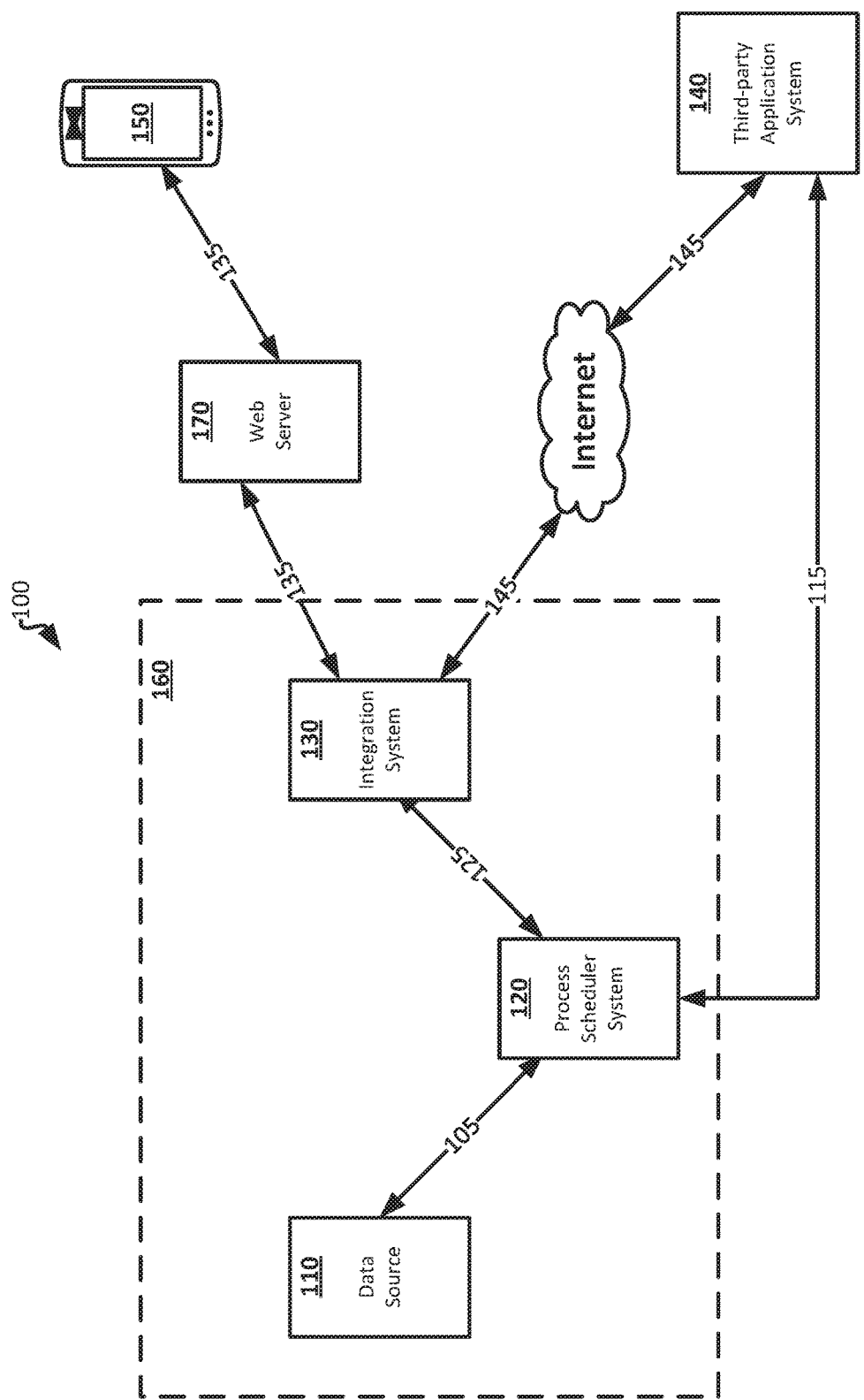
FIG. 1 illustrates an exemplary network for implementing one or more embodiments described within the disclosure.

FIG. 1 shows an exemplary network 100 in accordance with one or more embodiments described in the disclosure. Network 100 comprises a data source 110, a process scheduler system 120, an integration system 130, a third-party application system 140, a web server 170, and a user device 150. In one embodiment, data source 110, process scheduler system 120, and integration system 130 are a part of sub-network 160. Sub-network 160 can be operated and controlled by the same entity/entities and/or can include devices that communicate over a more controlled network as compared to the Internet (e.g., a local area network and/or wide area network). In some instances, sub-network 160 may be a cloud network.

Data source 110 stores data that is internal to sub-network 160. For example, data source 110 may store human resource documents, supplier relationship data, financial documents, supply chain management documents, enterprise services data, technical documents, work product, and other data associated with sub-network 160. In one embodiment, sub-network 160 may be a network operated by a single company and data source 110 may store one or more datasets used by the company in its daily operations. Data source 110 may receive data as a result of one or more processes performed by a company operating sub-network 160. For example, a company may add a new employee. One or more human resource applications may be used to generate new employee data. This new employee data may be stored in data source 110. In one embodiment, there may be multiple devices in sub-network 160 (e.g, device 1 and device 2) that communicate with each other. Communication logs between those devices may be stored in data source 110. Such communication logs may be useful for compliance testing, virus testing, and/or determining security vulnerabilities. Device 1 and device 2 may be routers in sub-network 160.

Data source 110 may comprise a database engine and an application database. The database engine may comprise software, hardware, or some combination of hardware and software. For example, database engine may comprise an application specific integrated circuit (ASIC), field gate programmable array (FGPA), and the like programmed with software to implement one or more functions described herein. The application database may be implemented via digital memory. For example, application database may comprise volatile (such as random access memory (RAM)) and/or non-volatile (such as read-only memory (ROM), flash memory, etc.) In some embodiments, the application database may include multiple different types of memory, such as static random access memory (SRAM) or dynamic random access memory (DRAM.) The application database may include application object definitions, system tables, applications and data corresponding to one or more applications or datasets utilized by sub-network 160. The application database may also comprise one or more datasets related to one or more internal operations of sub-network 160. For example, the application database may contain human resource documents, financial documents, communication logs, and the like. In one embodiment, data source 110 may run a relational database management system (RDBMS.) Data source 110 may simultaneously support multiple batch processes and programs (implemented by process scheduler system 120) running against it. Data source 110 is connected to process scheduler system 120 via connection 105.

Connection 105 can be a data connection internal to sub-network 160 and can be used to facilitate communication between data source 110 and process scheduler system 120. In one embodiment, connection 105 is a private connection that may be only accessible by authorized personal and devices of sub-network 160. Connection 105 may be implemented by a local area network (LAN), such as one based on Ethernet, Token-Ring, and/or the like.

A firewall associated with connection 105 may be implemented to authorize one or more devices to utilize connection 105. The firewall may sit in between data source 110 and process scheduler system 120, within data source 110, or within process scheduler system 120. The firewall can receive an identifier associated with a device (e.g., hardware identifier, trusted platform module (TPM) generated identifier, etc.) and can compare the received identifier to a predetermined whitelist of authorized device identifiers. If the received device identifier does not match a device identifier in the predetermined whitelist, then the firewall may intercept and inhibit communications over connection 105 to and from the corresponding device.

Process scheduler system 120 may include one or more applications that schedule and manage the execution of batch processes. Process scheduler system 120 may schedule recurring processes to run on any date or time interval that is required, such as monthly, daily, hourly, or by the minute. Process scheduler system 120 can create jobs (groups of processes) that run several processes and conditionally schedules successive processes based on the status of a previous process in the job. A system administrator of sub-network 160 may access process scheduler system 120 through a web browser to run or schedule a batch process request. A batch process request may also be triggered based on a predetermined schedule, automated process, and/or an event detection. In one embodiment, the batch process request is triggered by a request from third-party application system 140 for one or more data sets stored at data source 110. For example, third-party application system 140 can send a request for advertisement records to process scheduler system 120. In response, process scheduler system 120 may schedule a batch process operation to send the requested data to third-party application system 140. Process scheduler system 120, via connection 105, may retrieve data from data source 110. Process scheduler system 120 may encode and segments the retrieved data in batches and may transmit the segmented data, via connection 115, to third-party application system 140. Process scheduler system 120 may also transmit the segmented data, via connection 125, to integration system 130.

In one embodiment, connection 115 is a private connection that can be accessible only by process scheduler system 120 and third-party application system 140. A firewall associated with connection 115 may be implemented to authorize one or more devices to utilize connection 115. The firewall may sit in between process scheduler system 120 and third-party application system 140, within process scheduler system 120, or within third-party application system 140. The firewall can receive an identifier associated with a device (e.g., hardware identifier, trusted platform module (TPM) generated identifier, etc.) and may compare the received identifier to a predetermined whitelist of authorized device identifiers. If the received device identifier does not match a device identifier in the predetermined whitelist, then then the firewall may intercept and inhibit communications over connection 115 to and from the corresponding device.

Integration system 130 can expose application logic implemented within third-party application system 140 as web services to user device 150. Integration system 130 may support a plurality of protocols and messaging formats. Integration system 130 can facilitate communication between process scheduler system 120, web server 170, and/or third-party application system 140. Integration system 130 may receive an initial communication in an initial format encode the initial communication into a second format. Because integration system 130 can support different protocols it can allow process scheduler system 120, web server 170 and/or third-party application system 140 to communicate with each other while all supporting different protocols and/or message formats.

Third-party application system 140 can be an application server that is affiliated with, controlled by, and/or operated by a third-party. In one embodiment, a third-party is an any entity other than the entity that controls or operates sub-network 160. In one embodiment, a third-party application system is an application server outside sub-network 160 that executes business logic and processes based on datasets received from sub-network 160. Third-party application system 140 can include one or more applications to host and execute business logic and processes. For example, third-party application system 140 may be an search engine server running applications configured to perform data-based searches.

Connections 125, 135, and 145 in network 100 can be data connections that facilitate the transfer of data between devices and/or systems. Connections 125, 135, and/or 145 may be implemented by any type of network familiar to those skilled in the art that can support data communications using any of a variety of commercially-available protocols, including without limitation TCP/IP (transmission control protocol/Internet protocol), SNA (systems network architecture), IPX (Internet packet exchange), and the like. Merely by way of example, connections 125, 135, and 145 may be implemented by a local area network (LAN), such as one based on Ethernet, Token-Ring and/or the like. Connections 125, 135, and 145 may be implemented by a wide-area network and/or the Internet. Connections 125, 135, and 145 can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks. In one embodiment, connection 115 is implemented by a private network and connections 135, and 145 are implemented by a public network.

User device 150 may be a device used by one or more users to indirectly access and/or use one or more data-store-based operations performed by third-party application system 140. User device 150 may run one or more web browser applications that communicate with web server 170. In one embodiment, user device 150, via a web browser application, sends an operation request to web server 170 for one or more operations to be performed by third-party application system 140. Web server 170 can route the operation request to third-party application system 140. Third-party application system 140 can perform one or more operations based on the received operation request and routes the operation result to web server 170. Web server 170 can transmit the operation result to user device 150. User device 150 may display one or more sets of data based on the received operation result. In one embodiment, all communications between third-party application system 140 and web server 170 are routed through integration system 130.

User device 150 may be a portable handheld device, a mobile phone, a smart phone, a tablet, a wearable device, or stationary device running one or more operating systems. Although only one user device 150 is depicted in FIG. 1 it is possible to implement a plurality of user devices.

Web server 170 may include a UNIX® server, mid-range server, mainframe computer, rack-mounted server, etc.), or any other appropriate arrangement and/or combination. Web server 170 can have one or more applications installed to implement Hypertext Transfer Protocol (HTTP) or other communication protocols in order relay communications between user device 150 and integration system 130 over network connection 135. Web server 170 can store, process, and deliver web pages to user device 150. In one embodiment, web server 170 may be integrated into integration system 130.

Process scheduler system 120 and/or integration system 130 may include one or more processing units and one or more sets of memory. Such a processing unit can be implemented as one or more integrated circuits, such as single core or multicore processors. In one embodiment, the processing unit may also be implemented as a quad-core processing unit formed by integrating two dual-core processors into a single chip. In various embodiments, the processing unit can execute a variety of programs in response to program code and can maintain multiple concurrently executing programs or processes. Through suitable programming, the processing unit can provide various functionalities described within this disclosure.

The memory may be volatile (such as random access memory (RAM)) and/or non-volatile (such as read-only memory (ROM), flash memory, etc.) The RAM may contain data and/or program modules that are immediately accessible to and/or presently being operated and executed by the processing unit. In some implementations, the memory may include multiple different types of memory, such as static random access memory (SRAM) or dynamic random access memory (DRAM). The memory may also be a tangible computer-readable storage medium for storing the basic programming and data constructs that provide the functionality of some embodiments described by this disclosure. Software (programs, code modules, instructions) that when executed by the processing unit provide the functionality described by this disclosure.

Integration System 130

Integration system 130 comprises a gateway 205, a plurality of listening connectors 210, and a plurality of target connectors 215. Listening connectors 210 can receive incoming messages, via connection 135, from web server 170 and deliver the incoming messages to gateway manager 205. Listening connectors 210 may comprise a plurality of connectors. Each connector can receive messages compliant with one or more formats. Each listening connector can have an associated Uniform Resource Locator (URL) address. To invoke a particular listening connector, web server 170 can send a message with a destination URL that matches the URL address of the particular listening connector. The HTTP connector can be capable of receiving HTTP formatted messages; the PSFT connector can be capable of receiving PeopleSoft (PSFT) formatted messages; the PSFT 8.1 connector can be capable of receiving PeopleSoft 8.1 formatted messages and HTTPS formatted messages; the JMS connector can be capable of receiving Java Message Service (JMS) formatted messages; the AS2 connector can be capable of receiving Applicability Statement 2 (AS2) formatted messages; the PSFT Services connector can be capable of receiving PeopleSoft Service formatted messages; and the REST connector can be capable of receiving Representational State Transfer (REST) formatted messages. Other protocols may be supported by listening connectors 210 such as Simple Object Access Protocol (SOAP) formatted messages, Extensible Markup Language (XML) formatted messages, Web Services Description Language (WSDL) formatted messages, and Web Application Definition Language (WADL) formatted messages. Messages received by listening connectors 210 may have two logical parts: the header and the body. The headers of a message may contain the information utilized by integration system 130 to process and deliver the payload of the message. The body of a message may contain the payload of the message.

Gateway manager 205 can receives messages from one of listening connectors 210 and can route it to one of target connectors 215. Gateway manager 205 can perform connection management for messages received by and output from integration system 130. Gateway manager 205 may access the header of the received message to determine which target connectors to use to properly deliver the messages to the intended recipients. The header can contain final destination information. For example, the header of a message may specify a first URL which can correspond to a listening connector and a destination URL which can correspond to third-party application system 140. Gateway manager 205 may access the header information to determine the destination URL. The gateway manager 205 can query internal storage, based on the destination URL, to determine a recommend format for messages to third-party application system 140. Based on the recommended format, gateway manager 205 can route the received message to a particular target connector.

Individual target connectors 215 can receive routed messages from gateway manager 205 and format the messages based on one or more recipient protocols. Target connectors 215 can send the formatted message, via connection 145, to third-party application system 140. Target connectors 215 may comprise a plurality of connectors and each connector may format a message to be compliant with one or more protocols. The HTTP target connector can format messages to be compliant with HTTP or HTTPS. The PSFT target connector can format messages to be compliant with the PeopleSoft messaging protocol. The PSFT 8.1 target connector can format messages to be compliant with PeopleSoft 8.1 protocols or the HTTPS. The JMS target connector can format messages to be compliant with JMS. The AS2 target connector can format messages compliant with AS2. The PSFT Services target connector can format messages to be compliant with PeopleSoft Service protocols. The REST target connector can format messages to be compliant with REST. Other protocols may be supported by target connectors 215 such as SOAP, WSDL, XML, WADL, File Transfer Protocol (FTP), Secure/SSH File Transfer Protocol (STFP.) In one embodiment, each target connector can have its own URL address.

In one embodiment, prior to formatting a message, a target connector may build a Multipurpose Internet Mail Extension (MIME) message from the header and body of the received message. A MIME message can comprise a first section and a second section. The first section may comprise an XML document that indicates the message header. The second section can comprise the body of the received message. Because listening connectors 210 are able to receive messages based on a plurality of formats and protocols and target connectors 215 are able to format and send messages based on a plurality of formats and protocols, integration system 130 can isolate third-party application system 140 from the protocols supported by integration system 130. This can allow devices (e.g., user device 150 and web server 170) to communicate with third-party application system 140 using several different protocols without requiring third-party application system 140 to implement additional hardware or software to support additional protocols.

Once target connectors 215 send the formatted message to third-party application system 140, third-party application system 140 can perform a requested operation based on the received formatted messaged and can return an operation result in the same format to one of target connectors 215. Gateway manager 205 can receive the operation result from one of target connectors 215 and can route it to one of listening connectors 210 based on a recipient's recommended protocol. One of listening connectors 210 can format the operation result based on the recipient's recommended protocol and can send the formatted operation result to the recipient.

Direct Transfer

Figure 3:
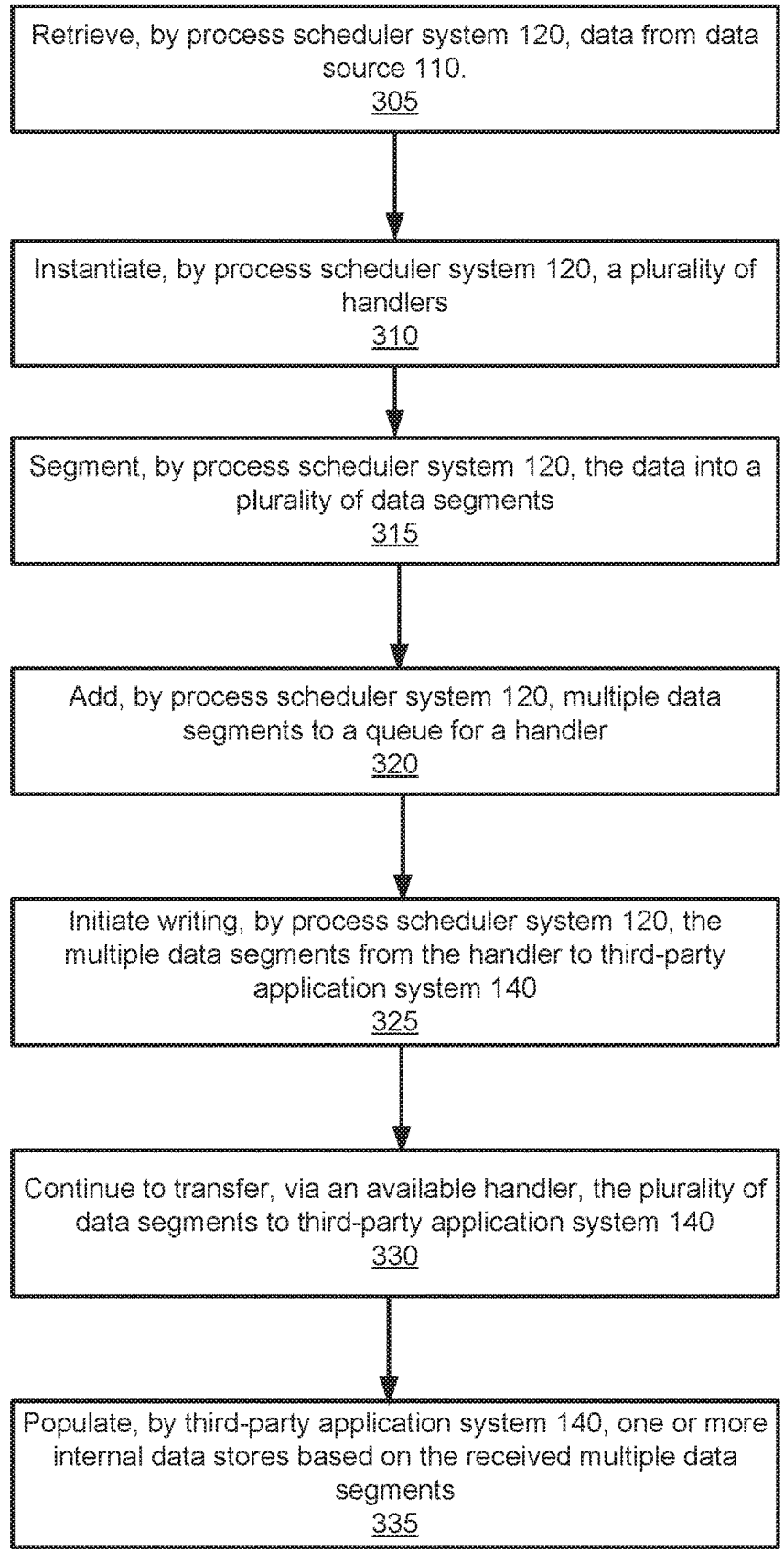
FIG. 3 illustrates an exemplary process according to one or more embodiments described within the disclosure.

FIG. 3 depicts an exemplary process 300 performed by one or more devices in network 100 in accordance with one or more embodiments of the disclosure. Process 300 is a process for facilitating the population of a data store in third-party application system 140.

At block 305, process scheduler system 120 accesses and retrieves data, via connection 105, from data source 110. Process scheduler system 120 may retrieve data from data source 110 by any known method or protocol. For example, process scheduler system 120 may query data source 110 for one more datasets. In one embodiment, the data retrieved by process scheduler system 120 can be data that third-party application system 140 can use to build a data store. For example, third-party application system 140 may comprise an application server running one or more search engine applications. In order to implement the one or more search engine operations, third-party application system 140 may use the received data to build a search engine index. Search engine indexing is the process of collecting, parsing, and storing data for use by a search engine. In this example, the data accessed by process scheduler system 120 can be used by third-party application system 140 to build one or more search engine indexes. As a result, when invoked, the search engine applications can perform search functions based on data from data source 110.

In one embodiment, third-party application system 140 requests one or more particular datasets from process scheduler system 120. For example, integration system 130 may receive, from third-party application system 140, a request for a certain dataset. Integration system 130 can route the request for the dataset to process scheduler system 120. Process scheduler system 120 may then queries data source 110 for stored data pertaining to the request. For example, third-party application system 140 may request human resource records for new employees over the last three years. This request may be received by integration system 130 and can be routed to process scheduler system 120. Process scheduler system 120 then may query data source 110 for the human resource records for new employees over the last three years.

At block 310, process scheduler system 120 instantiates a plurality of handlers to facilitate the transmission of data between process scheduler system 120 and third-party application system 140. A handler (also known as a data handler) can be a reusable logic entity that facilitates the transfer of data between devices or applications. The handler can use URL syntax to facilitate data transfer. In one embodiment, a handler may be a part of the cURL library. cURL is a software library and application programming interface for transferring between devices data using various protocols (e.g., HTTP, Gopher, Lightweight Directory Access Protocol (LDAP).) In one embodiment, each handler may be capable of facilitating data transfer using a variety of protocols. This may be advantageous in systems where process scheduler system 120 communicates with a plurality of third-party application systems that may implement different communication protocols and data formats. Each handler may be capable of carrying a certain quantity of data from a source to a destination.

The number of instantiated handlers may be based on one or more factors including, but not limited to: available bandwidth of connection 115, available computer resources of process scheduler system 120, available computer resources of third-party application system 140, the quantity of data to be sent, one or more predefined time requirements, and a target transmission speed.

At block 315, process scheduler system 120 segments the retrieved data (from block 305) into a plurality of data segments. Data segmentation is the process of dividing data into smaller units for transmission over a network. Data segmentation may produce data segments of approximately equal sizes (e.g., within 0.01-1 MB) according to predefined threshold (e.g., each segment is less than 15 MB.) Each handler may have a limit on the quantity of data it is capable of transferring at a given time. Thus, data can be segmented to comply with handler data quantity requirements. In one embodiment, data segmentation can be used to increase the probability that each sent data segment is received correctly by third-party application system 140. Big data sets may have a lower probability of being transmitted correctly as opposed to smaller data segments due to their size. Each data segment may vary in size.

At block 320, process scheduler system 120, adds multiple data segments to a queue for a handler. Each instantiated handler may have a corresponding queue. The queue for each handler can store data segments that can be loaded into the handler and transmitted to third-party application system 140. Each queue may have a data threshold that once exceeded indicates to process scheduler system 120 to stop adding data segments to the queue. Once the quantity of data in a queue exceeds the data threshold, the adding of multiple data segments to that particular queue may be complete (i.e. the queue is filled.) For example, a queue may have a data threshold of 30 MB and a maximum capacity of 40 MB. Once at least 30 MB of data has been added to the queue the particular queue is filled.

At block 325, process scheduler system 120, initiates writing of multiple data segments from a handler to third-party application system 140. The writing may be initiated asynchronously or synchronously across some or all handlers. In one embodiment, with respect a given set of data segments, a first writing initiation is performed synchronously across handlers and subsequent writing transmissions (performed in response to having reloaded respective handlers' queues) are performed asynchronously. Writing of a data segment comprises three steps: extracting the data segment(s) from a handler's queue, writing the extract data segment(s) into the corresponding handler and subsequently transmitting the handler to third-party application system 140.

In order to determine when to initiate writing of multiple data segments, process scheduler system 120 may access a handler status value associated with a handler. Each handler may have a corresponding handler status value that indicates the status of the handler. In one embodiment, the handler status value may indicate if a handler is available to receive data, ready to transmit data, ready to retransmit data, or is in the process of transmitting data. Process scheduler system 120 may modify a handler status value based on one or more factors associated with a handler. In one embodiment, process scheduler system 120 may modify a handler status value to available if a corresponding handler has successfully completed a data transmission to third-party application system 140. In one embodiment, process scheduler system 120 may modify a handler status value to ready to transmit data if a corresponding handler's queue is filled. In one embodiment, process scheduler system 120 may modify a handler status value to ready to retransmit data when a data transmission associated with the handler has failed to be successfully received by third-party application system 140. In one embodiment, process scheduler system 120 may modify a handler status value to in the process of transmitting data if the corresponding handler is in the process of transmitting data to third-party application system 140.

In one embodiment, to perform a first writing initiation synchronously across handlers, prior to initiating writing for any handler, process scheduler system 120 determines a quantity of handlers that are ready to transmit data. Process scheduler system 120 may initiate the writing of a handler if it is determined that the quantity of handlers that are ready to transmit data exceeds a predefined handler-sending threshold. For example, process scheduler system 120 can query its internal memory to locate a predefined handler-sending threshold. The handler-sending threshold value can be 5 and process scheduler system 120 can have 10 handlers instantiated. Process scheduler system 120 may load data segments into a handler's queue until the handler's queue data threshold is exceeded (i.e. queue is filled.) Once the queue is filled, process scheduler system 140 may modify the handler status value associated with the handler to ready for transmission. However, depending on the size of data segments that are being loaded into a handler's queue it may take process scheduler system 120 different amounts of time to process (e.g., retrieve and segment) data from data source 110 for different handler's queues. As a result, some handler queues may be filled before others. In such an instance, process scheduler system 120 waits until at least 5 handler queues are ready to transmit data before initiating writing for the handlers that are ready to transmit data.

The predefined handler-sending threshold may be set based on one or more factors including, but not limited to: available bandwidth of connection 115, available computer resources of process scheduler system 120, available computer resources of third-party application system 140, the quantity of data to be sent, one or more predefined time requirements, and a target transmission speed. For example, process scheduler system 120 may spend a significant amount of resources retrieving and segmenting data. In such an instance, the handler-sending threshold may be lower than if process scheduler system 120 spends only a small portion of resources retrieving and segmenting data.

At block 330, process scheduler system 120, based on a corresponding handler status value, continues to transfer data segments, to third-party application system 140. Each handler can have a corresponding handler status value that indicates the status of the handler. Once process scheduler system 120 sends data segments via one or more handlers in block 325, process scheduler system 120 may wait for a corresponding status value from third-party application system 140. The status value can indicate whether a handler is in the process of a data transmission, a data transmission is successful (i.e. complete), or a data transmission has failed. In one embodiment, the handler status value can be the status value of a handler from the prospective of process scheduler system 120 and the status value can be the status value of a handler from the prospective of third-party application system 140.

In one embodiment, process scheduler system 120 may modify a handler status value to available in response to receiving a status value that indicates a handler successfully completed a data transmission. For example, each handler that is transmitted to third-party application system 140 may have a corresponding handler identification (ID.) When a handler is received at third-party application system 140, the receiving port may save, to a data log, the handler ID and a status value. The status value may indicate a successful data transmission (e.g., no major errors.) Third-party application system 140 can send the status value along with the handler ID to process scheduler system 120. Process scheduler system 120 may then modifies the handler status value of the handler to available. As a result, the processing scheduler system 120 may add one more additional data segments to the handler's queue.

In one embodiment, in circumstances when process scheduler system 120 detects that two or more handlers' queues are available, process scheduler system 120 may add additional data segments to a first handler's queue at a first time and add additional data segments to a second handler's queue at a time later than the first time. Adding additional document segments to a first handler's queue and a second handler's queue at different times creates an asynchronous writing of handlers to third-party application system 140.

In one embodiment, in response to determining a transmission associated with a handler has failed to be successfully received by third-party application system 140, process scheduler system 120 may modify a handler status value to ready to retransmit data. Third-party application system 140 may determine a transmission has failed based on one or more factors including, but not limited to: identifying a checksum does not match one or more received data segments associated with a handler; identifying one or more parts of received data segments are not readable; and determining a timeout has occurred at a receiving port. For example, when a handler is received at third-party application system 140, the receiving port may save, to a data log, the handler ID and a status value. The status value may indicate a failed data transmission (e.g., checksum does not match more or more received data segments.) Third-party application system 140 may send the status value along with the handler ID to process scheduler system 120. Process scheduler system may then modify the handler status value of the handler to ready to retransmit data.

In one embodiment, process scheduler system 120 may determine a transmission has failed based on one or more factors including, but not limited to: determining a handler status value has not be received from third-party application system 140 within a time threshold; receiving a handler status value update from third-party application system 140, and receiving a connection timeout indication corresponding to one or more handlers. In instances where process scheduler system 120 determines a transmission has failed, process scheduler system 120 may modify a corresponding handler status value to ready to retransmit data without a received status value from third-party application system 140.

In circumstances when a handler status value is ready to retransmit data, process scheduler system 120 may extract the same data segments from the handler's queue and write the extracted data segments into the corresponding handler for subsequent retransmission to third-party application system 140. In one embodiment, data segments added to a handler's queue can stay in the handler's queue until process scheduler system 120 has received an indication that a transmission associated with the handler has been successfully completed (i.e. successfully received by third-party application system 140.) By holding the data segments in a handler's queue it can allow process scheduler system 120 to retransmit data segments without having to reprocess the data (i.e. retrieve and segment), which can increase the efficiency of process scheduler system 120.

In circumstances when process scheduler system 120 determines, using a corresponding handler status value, there are no handler's available, process scheduler system may take different actions. In one embodiment, process scheduler system 120 stops retrieving data from data source 110 (block 305) and/or stops segmenting data (block 315.) By stopping one or more of these processes, process scheduler system 120 may efficiently use computing resources. In some embodiments, process scheduler system 120 will continuously retrieve data from data source 110 and segment the retrieved data. However, it may not be efficient to utilize computational resources of process scheduler system 120 to retrieve data, and/or segment data if there are no handler available.

At block 335, third-party application system 140 populates one or more internal data stores based on the received multiple data segments. By populating one or more data stores with the received multiple data segments, third-party application system 140 may apply business logic to data from data source 110 without being internal to sub-network 160. For example, third-party application system 140 may build a search engine index based on the received multiple data segments. The search engine index may comprise search definitions based on data from data source 110. In this embodiment, third-party application system may perform data-store-based operations such as crawling for updates, maintaining indexes, and servicing user search requests.

Operation Request

Figure 4:
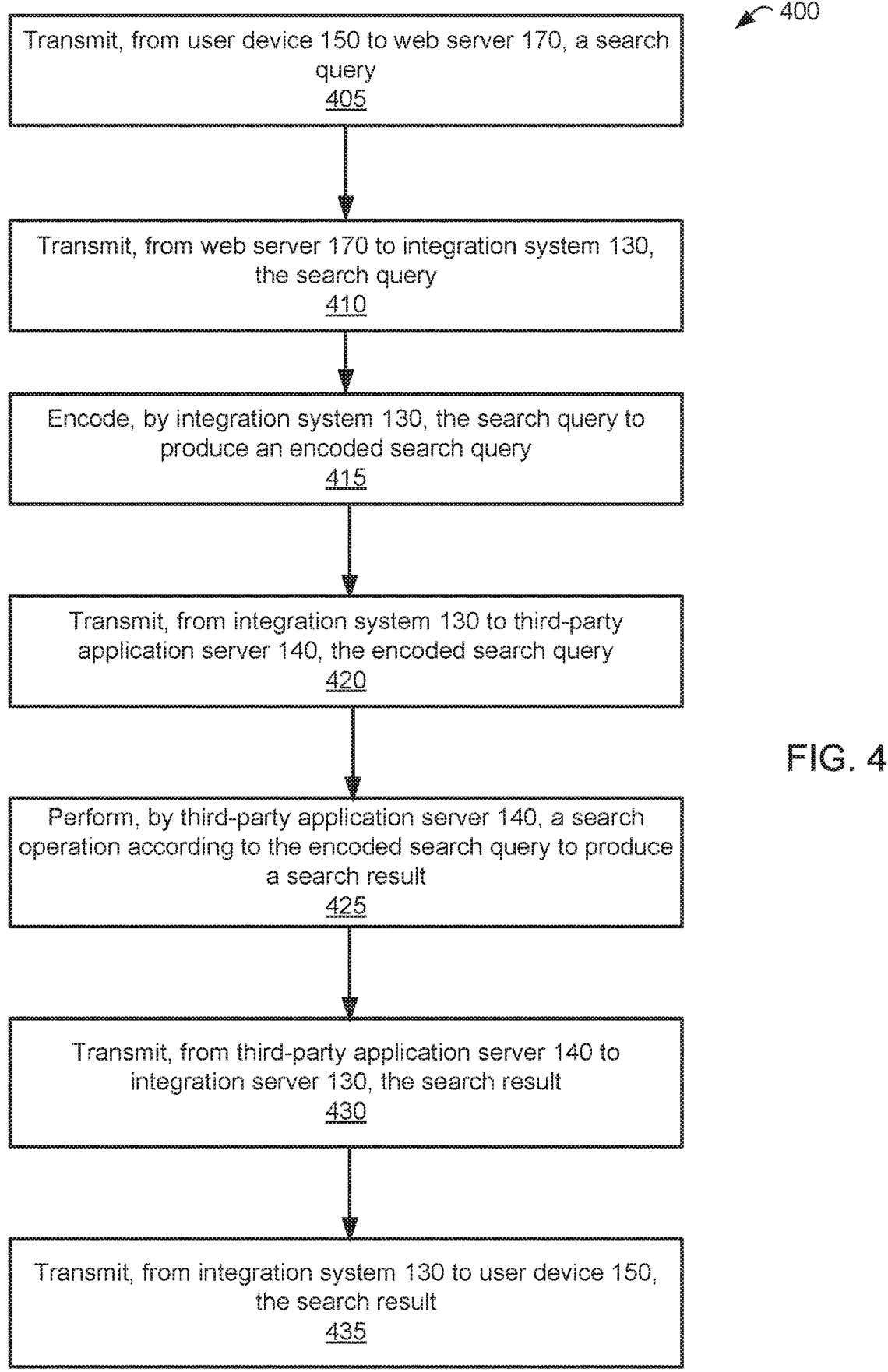
FIG. 4 illustrates an exemplary process according to one or more embodiments described within the disclosure.

FIG. 4 depicts an exemplary process 400 for facilitating a data-store-based operation performed by third-party application system 140. Process 300 populates a data store in third-party application system 140 and process 400 facilitates user device access to one or more data-store based operations. In one embodiment, process 300 and process 400 may be performed in parallel. In one embodiment, one or more steps of process 300 may be completed prior to starting any step of process 400.

Process 400 can correspond to a method for data transfer between three independently operated systems (i.e. user device 150, integration system 130, and third-party application system 140.) At block 405, user device 150 sends to web server 170, a search query. Web server 170 may transmit data for display within a web browser to user device 150. User device 150 may generate the search query based on a user interaction with the displayed data. For example, web server 170 may transmit a Hypertext Markup Language (HTML) document to user device 150. User device 150 can render the HTML document to display a web page within a web browser. The web page may indicate a search field. A user of user device 150 may interact with the displayed search field by typing in text such as "Communication records between device 1 and device 2 from May 2015 to May 2016." User device 150 may generate the search query based on the input text and transmit it to web server 170.

The search query can comprise a header and a payload. The header of the search query can indicate the destination of the search query. For example, the header may comprise the location of web server 170 and/or the location of third-party application system 140. The payload of the search query may comprise at least one string of data that can be used to conduct one or more searches. For example, the payload of a search query may comprise the string "Communication records between device 1 and device 2 from May 2015 to May 2016."

At block 410, web server 170 transmits, to integration system 130, the received search query. In one embodiment, web server 170 may change the header of the received search query to indicate the location of the integration system 130. In one embodiment, the communications to and from web server 170 may conform to HTTP.

Figure 2:
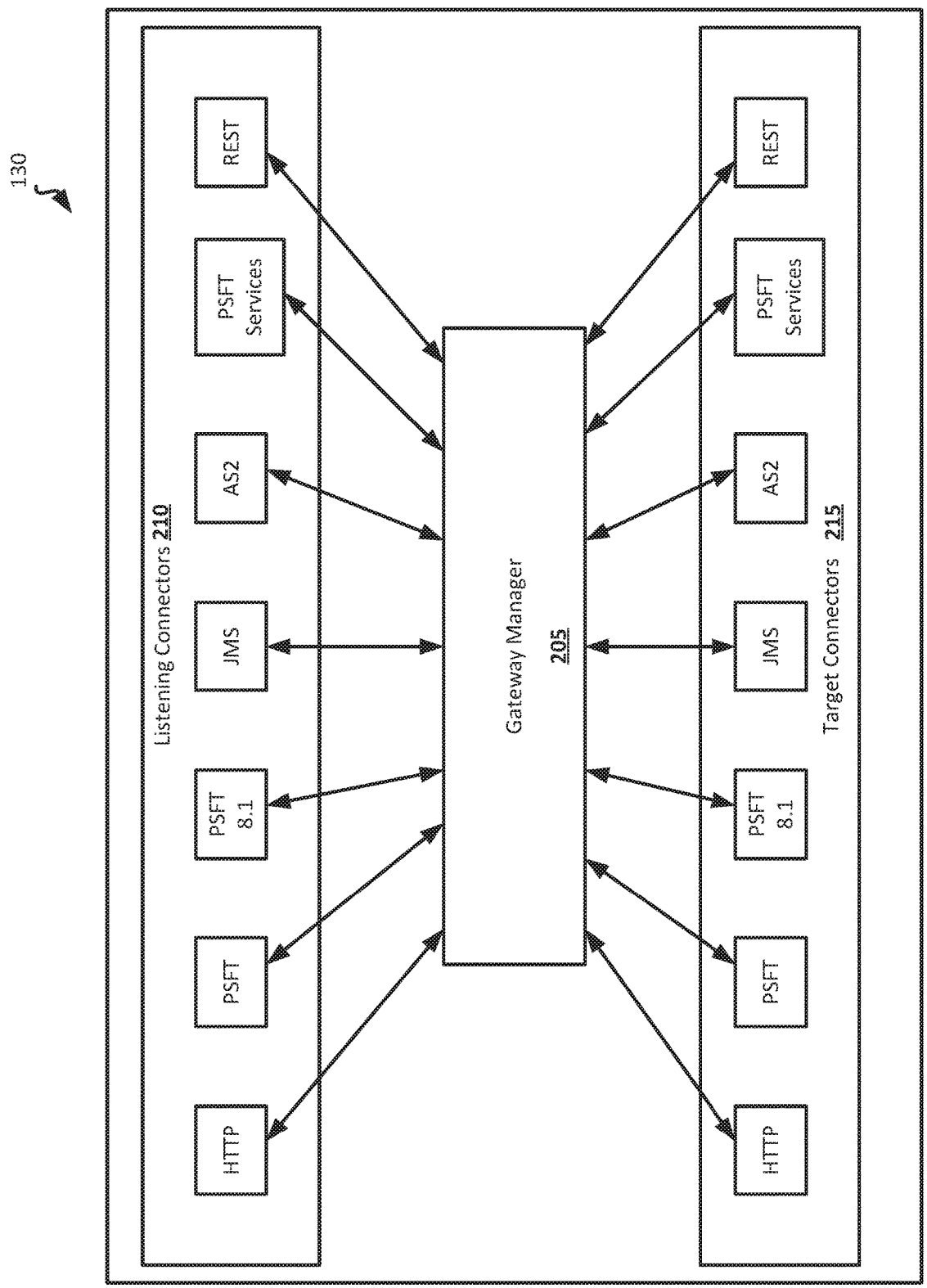
FIG. 2 illustrates an exemplary integration system for implementing one or more embodiments described within the disclosure.

At block 415, integration system 130 encodes the received search query to produce an encoded search query. The search query can be received by one of the listening connectors of integration system 130 (as shown in FIG. 2.) The search query may be formatted according to a plurality of different protocols (e.g., HTTP, HTTPS, AS2, REST, and PSFT.) The header of the search query may indicate, to integration system 130, the location of an application server to perform the requested search (i.e. third-party application system 140.) The location and identity of third-party application system 140 may be identified by an URL address. Integration system 130 may query internal memory to locate an application server log which includes application servers and corresponding application server protocols. For example, integration system 130 may extract, from the header of the received search query, a URL identifying third-party application system 140. Integration system 130, may then query its internal application server log using the URL to determine one more protocols associated with the third-party application system 140. By storing an application server log, integration system 130 may quickly identify what protocol to use to communicate with third-party application system 140.

After integration system 130 determines one or more protocols compatible with third-party application system 140, integration system 130 encodes the received payload data to be compliant with one of the acceptable protocols. For example, integration system 130 may receive a search query that is formatted in accordance with HTTP1.1. Integration system 130 may then extract a URL to identify third-party application system 140 and can determine third-party application system 140 can accept messages in accordance with HTTP2. Integration system 130, may extract the payload from the search query and can encode the payload into a format compatible with HTTP2. The process of encoding a payload may be different depending on the protocol. In one embodiment, the payload itself may not be encoded, but instead headers associated with the payload may be encoded. Integration system 130 may support a myriad of different communication protocols, which can enable web server 170 and third-party application system 140 to be protocol agnostic.

At block 420, integration system 130 transmits, to third-party application system 140, the encoded search request produced at block 415. Integration system 130 can use one or more target connectors to transmit, using a compatible protocol, the encoded search request.

At block 425, third-party application system 140 performs a search operation based on the received encoded search request and its one or more internal data stores. Third-party application system 140 can include an application server running applications configured to perform data searches based on data stored in one or more internal data stores and/or remote data stores at least partly managed by third-party application system 140. The data store(s) can be populated by process 300. Thus, the search operation performed by third-party application system 140 can be an example of a data-store-based operation. Third-party application system 140, can extract the payload of the encoded search request and perform a search based on the payload data. For example, the encoded search request may comprise a payload with the string "Communication records between device 1 and device 2 from May 2015 to May 2016." Third-party application system 140 may use its internal search engine index (created based on data stores populated according to process 300) to generate a search result. In this instance, the search result may return a communication log that details all communications between device 1 and device 2 from May 2015 to May 2016 or a link to a communication log that details all communications between device 1 and device 2 from May 2015 to May 2016.

At block 430, third-party application system 140 transmits, to integration system 130, the search result. The search result can be formatted to be compatible with a protocol supported by web server 170. The search result may include a header and a payload. The header may include one or more destination locations. For example, the destination location may be the location of integration system 130, web server 170, and/or user device 150. The payload may include one or more datasets generated as a result of the search operation. For example, the payload may include a communication log that details all communications between device 1 and device 2 from May 2015 or May 2016 or a link to a communication log that details all communications between device 1 and device 2 from May 2015 to May 2016. In one embodiment, third-party application system 140 may segment the search result into a plurality of search result segments. Such segmentation may be implemented when the search result contains a voluminous amount of data (e.g., greater than 10 MB.) The transmitted search result can be received by a target connector of integration system 130.

At block 435, integration system 130 transmits, via web server 170, the search result to user device 150. As described above, integration system 130 may encode the search result to comply with a one or more protocols supported by web server 170. Integration system 130 can send the search result (or encoded search result) to web server 170. Web server 170 may then present search result based data to user device 150. In one embodiment, web server 170 can receive the search result, include the search result in an HTML document, and transmit the HTML document to user device 150. User device 150 can render the HTML document using a web browser to display search result based data. For example, Web server 170 may receive a search result that includes a link to a communication log that details all communications between device 1 and device 2 from May 2015 to May 2016. These links may be included in an HTML document and the HTML document may be sent to user device 150. User device 150 may then render the received HTML document and a link to a communication log that details all communications between device 1 and device 2 from May 2015 to May 2016 can be displayed on user device 150.

Although process 400 has been described in terms of a search request and search result, it is within the scope of the disclosure to use any operation request and any operation result. For example, instead of a search query, user device 150 may send a scheduling query and third-party application system 140 may perform one or more scheduling operations based on the scheduling query. The combination of processes 300 and 400 can enable a user device to request one or more operations of an application server performed on data from data source 110 without the user device or application server being a part of sub-network 160.

Modified Direct Transfer

Figure 5A:
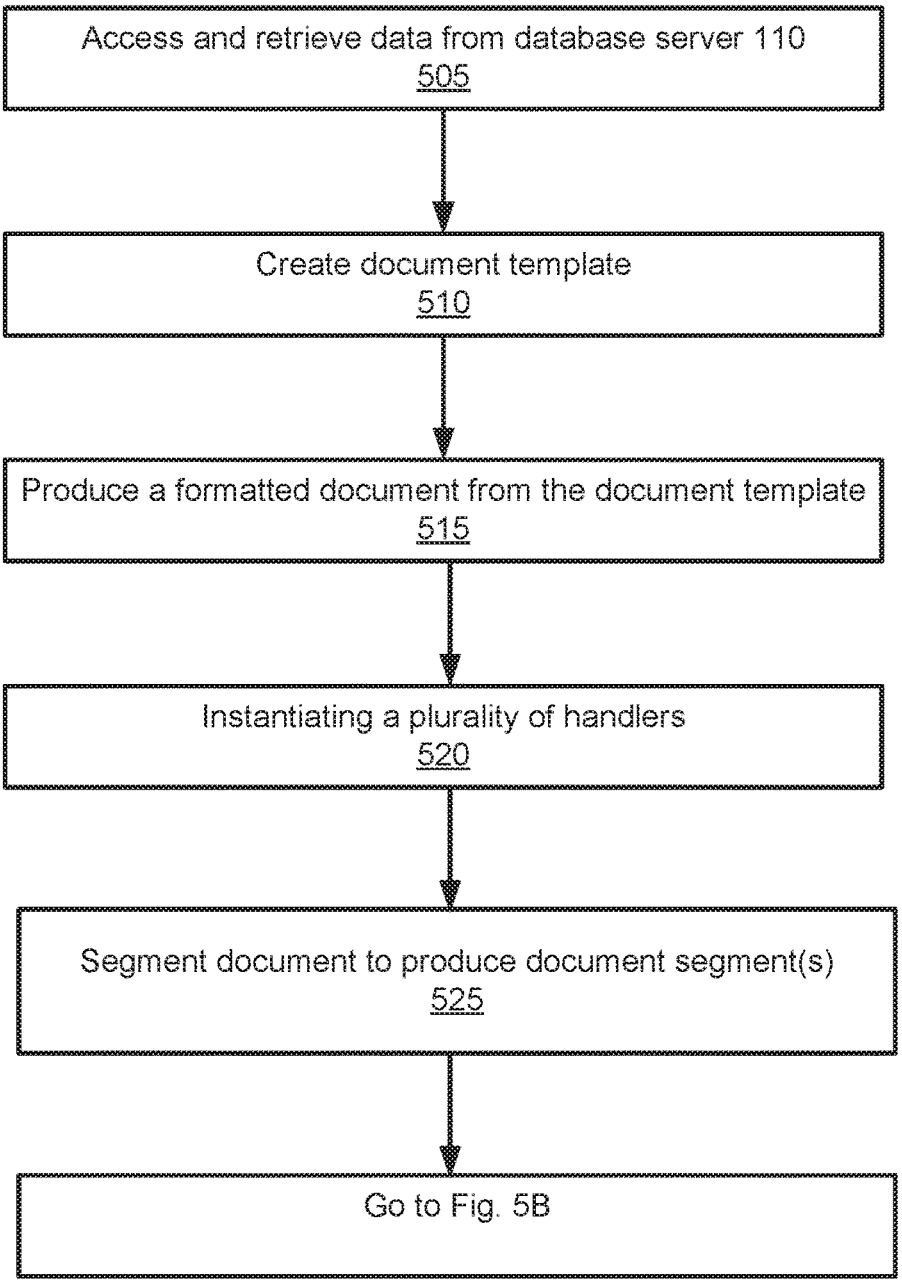
FIG. 5A illustrates an exemplary process according to one or more embodiments described within the disclosure.
Figure 5B:
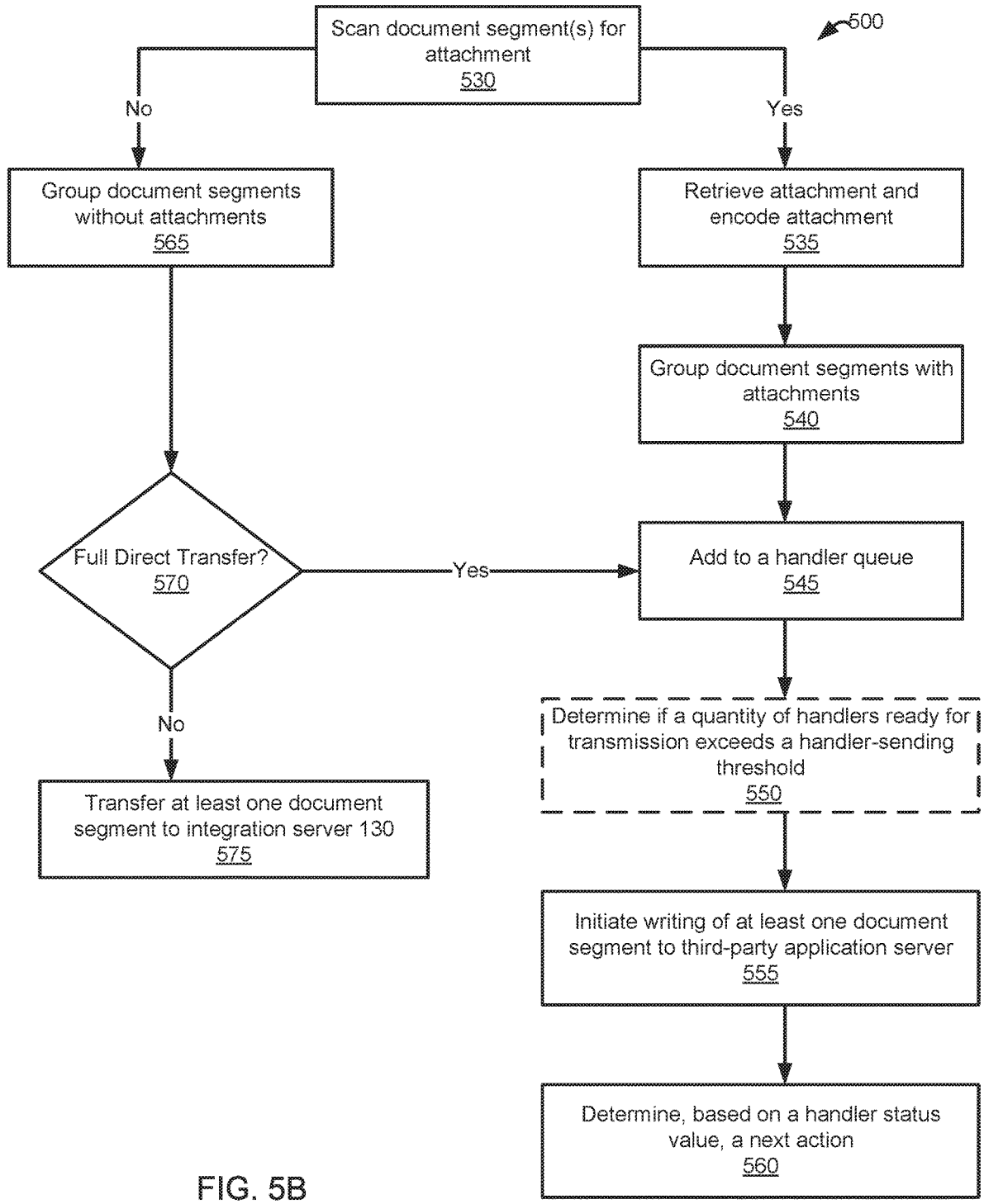
FIG. 5B illustrates an exemplary process according to one or more embodiments described within the disclosure.

FIGS. 5A-5B depicts an exemplary process 500 performed by one or more devices in network 100 in accordance with one or more embodiments of the disclosure. Process 500 is a process for facilitating the population of a data store in third-party application system 140. Process 500 may be an alternate to process 300.

At block 505, process scheduler system 120 accesses and retrieves data, via connection 105, from data source 110. Process scheduler system 120 may retrieve data from data source 110 by any known method or protocol. For example, process scheduler system 120 may query data source 110 for one more datasets. In one embodiment, the data retrieved by process scheduler system 120 is data that third-party application system 140 can use to build a data store. For example, third-party application system 140 may be an application server running search engine applications. In order to implement one or more search engine operations, third-party application system 140 may use the received data to build a search engine index. Search engine indexing is the process of collecting, parsing, and storing data for use by a search engine. In this example, the data accessed by process scheduler system 120 can be used by third-party application system 140 to build one or more search engine indexes. As a result, when invoked, the search engine applications can perform a search function based on data from data source 110.

In one embodiment, third-party application system 140 requests one or more particular datasets from process scheduler system 120. For example, integration system 130 may receive, from third-party application system 140, a request for a certain dataset. Integration system 130 can route the request for the dataset to process scheduler system 120. Process scheduler system 120 may then query data source 110 for stored data pertaining to the request. For example, third-party application system 140 may request human resource records for new employees over the last three years. This request can be received by integration system 130 and routed to process scheduler system 140. Process scheduler system 120 can then query data source 110 for the human resource records for new employees over the last three years.

At block 510, process scheduler system 120 creates a document template. A document template can be a template for facilitating the formatting of data from a first form to a second form. For example, a JSON document template is a template for producing a JSON compliant document (i.e. JSON document.) A JSON document can be a file format that uses human-readable text to transmit data objects. Because a JSON document is text only, if process scheduler system 120 attempts to load binary data into a JSON document template, an error may occur or the binary data may be represented in some text form. The document template helps assure that a particular data format is applied to a data set. The document template may be a JSON document template or another type of document template (e.g., XML.)

At block 515, process scheduler system 120 produces a formatted document from the document template. Process scheduler system 120 can use the data retrieved at block 505 and can load this data into the document template created at block 510 to produce the formatted document. Data stored in data source 110 may be stored in a first format (e.g., fixedvar) and process scheduler system 120 may format the retrieved data to a second format (e.g., JSON) that can be processed by third-party application system 140. Many document format types such as JSON and XML support text only. In instances where the retrieved data comprises non-text data such as binary data (e.g., image files, audio files, video files), the document template may indicate a reference to that binary data. For example, binary data may be indicated by a data file path.

At block 520, process scheduler system 120 instantiates a plurality of handlers to facilitate the transmission of data between process scheduler system 120 and third-party application system 140. A handler (also known as a data handler) can be a reusable logic entity that facilitates the transfer of data between devices or applications. The number of instantiated handlers may be based on one or more factors, such as: available bandwidth of connection 115, available computer resources of process scheduler system 120, available computer resources of third-party application system 140, the quantity of data to be sent, one or more predefined time requirements, and a target transmission speed.

At block 525, process scheduler system 120 segments the formatted document (from block 515) into a plurality of document segments. As previously described, data segmentation is the process of dividing data into smaller units for transmission over a network. For example, the formatted document may be segmented to produce document segments of less than 1 MB. The document segment size may be based on the number of handlers available to process scheduler system 120 and/or the bandwidth limitations of one or more connections in network 100.

At block 530, process scheduler system 120 scans each of the document segments created at block 525 to determine whether the document segment includes an attachment. The scan can be performed in a linear fashion to determine if any document segment(s) contain a reference to an attachment. In some embodiments, an attachment can be data that is referenced by a document segment but is not a part of the document segment. In some embodiments, an attachment can be binary data that has been converted to text. For example, process scheduler system 120 may create a JSON document and can segment the JSON document. Process scheduler system 120 may scan the JSON segments and can locate a JSON segment that refers to an audio file by indicating the audio file's file path within JSON segment. The audio file can be referenced by the JSON document but may be physically stored in data source 110 at the location indicated by the audio file's file path.

If the document segment does contain a reference to an attachment, at block 535, process scheduler system 120 retrieves the attachment and encodes the attachment. In one embodiment, process scheduler system 120 may query data source 110 according to a file path indicated in a document segment to retrieve the attachment. Next, process scheduler system 120 can encode the retrieved attachment using the Base64 encoding scheme. Base64 is a binary-to-text encoding scheme that represents binary data in ASCII string format. By using Base64 to encode an attachment, the attachment may be sent as text in accordance with the document segment's format (e.g., JSON.) At block 540, process scheduler system 120 groups together document segments with attachments. Process scheduler system 120 can group together document segments by associating a transmission type identifier with the document segments. In this instance, the transmission type identifier can be set to a direct transfer value.

At block 545, process scheduler system 120 adds multiple document segments to a queue for a handler. Each instantiated handler may have a corresponding queue. The queue for each handler can store document segments that can be loaded into the handler and transmitted to third-party application system 140. Each queue may be associated with a data threshold that, once exceeded, indicates to process scheduler system 120 to at least temporarily stop adding documents segments to the queue. For example, adding document segments to a queue can be paused for a defined time period or until it is detected that a quantity of data in the queue falls below a predefined lower threshold. Once the quantity of data in a queue exceeds the data threshold, the adding of multiple document segments to that particular queue is complete (i.e. queue is filled.)

At block 550, process scheduler system 120 optionally determines if a quantity of handlers ready for transmission exceeds a handler-sending threshold. Block 550 is optional and process 500 may be performed without performing operations associated with block 550. Each handler can have a corresponding handler status value that indicates the status of the handler. In one embodiment, the handler status value may indicate if a handler is available to receive data, ready to transmit data, ready to retransmit data, or is in the process of transmitting data. Once a queue for a handler is filled, process scheduler system 120 may modify the corresponding handler status value to indicate the handler is ready to transmit data. Process scheduler system 120 may access one or more handler status values to determine a quantity of handlers ready for transmission. Process scheduler system 120 may then compare the quantity of handlers ready for transmission to a predetermined handler-sending threshold. For example, process scheduler system 120 can query its internal memory to locate a predefined handler-sending threshold. The handler-sending threshold value can be 5 and process scheduler system 120 can have 10 handlers instantiated. Process scheduler system 120 may load document segments into a handler's queue until the handler's queue data threshold is exceeded. However, depending on the size of document segments that are being loaded into a handler's queue it may take process scheduler system 120 different amounts of time to process (e.g., retrieve, format, and segment) data from data source 110 and input that processed data into a handler's queue. As a result, some handler queues may be filled before others. In such an instance, process 500 may move to block 555 only when at least 5 handler queues are filled.

The predefined handler-sending threshold may be set based on one or more factors including, but not limited to: available bandwidth of connection 115, available computer resources of process scheduler system 120, available computer resources of third-party application system 140, the quantity of data to be sent, one or more predefined time requirements, and a target transmission speed. For example, process scheduler system 120 may spend a significant amount of resources retrieving, formatting, and segmenting data. In such an instance, the handler-sending threshold may be lower than if process scheduler system 120 spent only a small portion of resources retrieving, formatting, and segmenting data.

At block 555, process scheduler system 120 initiates writing of multiple document segments from a handler to third-party application system 140. The writing may be initiated asynchronously or synchronously across some or all handlers. In one embodiment, with respect a given set of document segments, a first writing initiation may be performed synchronously across handlers and subsequent writing transmissions (performed in response to having reloaded respective handlers' queues) can be performed asynchronously. Writing of a document segment may comprise three steps: extracting the document segment(s) from a handler's queue, writing the extracted document segment(s) into the corresponding handler and subsequently transmitting the handler to third-party application system 140. Process scheduler system 120 may perform the initial writing synchronously across handlers by performing the operations described in relation to block 550 prior to the operations described in relation to block 555. For example, process scheduler system 120 can determine that a quantity of handlers ready for transmission exceeds a handler-sending threshold. Once this determination has been made, process scheduler system 120 can synchronously initiate writing across the handlers that are ready for transmission.

Processing scheduler system 120 may initialize writing asynchronously by initiating writing on a handler by handler basis. Process scheduler system 120 may access a handler status value to determine if a corresponding handler is ready for transmission. A handler status value may indicate a handler is ready for transmission if the adding of multiple document segments to that particular queue is complete (i.e. queue is filled.) Once process scheduler system 120 determines a handler is ready for transmission, process scheduler system 120 may initiate writing for the corresponding handler.

At block 560, process scheduler system 120, determines, based on a handler status value, a next action to perform. Once process scheduler system 120 sends document segments via one or more handlers as described by operations related to block 555, process scheduler system 120 can wait for a corresponding status value from third-party application system 140 and based on the received status value, process scheduler system 120 may modify a handler status value for the handler. The status value can indicate whether a handler is in the process of a data transmission, a data transmission is successful (i.e. filled), or a data transmission has failed. In one embodiment, the handler status value can be the status value of a handler from the prospective of process scheduler system 120 and the status value can be the status value of a handler from the prospective of third-party application system 140.

In one embodiment, process scheduler system 120 may modify a handler status value to available in response to receiving a status value that indicates a handler successfully completed a data transmission. For example, each handler that is transmitted to third-party application system 140 may have a corresponding handler identification (ID.) When a handler is received at third-party application system 140, the receiving port can save, to a data log, the handler ID and a status value. The status value may indicate a successful data transmission (e.g., no major errors.) Third-party application system 140 can send the status value along with the handler ID to process scheduler system 120. Process scheduler system 120 may then modify the handler status value of the handler to available.

In response to determining, using a corresponding handler status value, that at least one handler's queue is available, process scheduler system 120 may add additional document segments to the handler's queue and can initiate writing of the additional document segments from the handler to third-party application system 140. In circumstances where process scheduler system 120 may detect two or more handlers' queues are available and process scheduler system 120 may add additional document segments to a first handler's queue at a first time and add additional document segments to a second handler's queue at a time later than the first time. Adding additional document segments to a first handler's queue and a second handler's queue at different times creates an asynchronous writing of handlers to third-party application system 140.

In one embodiment, in response to determining a transmission associated with a handler has failed to be successfully received by third-party application system 140, process scheduler system 120 may modify a handler status value to ready to retransmit data. Third-party application system 140 may determine a transmission has failed based on one or more factors including, but not limited to: identifying a checksum does not match one or more received document segments associated with a handler; identifying one or more parts of received document segments are not readable; and determining a timeout has occurred at a receiving port. For example, when a handler is received at third-party application system 140, the receiving port can save, to a data log, the handler ID and a status value. The status value may indicate a failed data transmission (e.g., checksum does not match more or more received document segments.) Third-party application system 140 may send the status value along with the handler ID to process scheduler system 120. Process scheduler system then modified the handler status value of the handler to retransmit.

In one embodiment, process scheduler system 120 may determine a data transmission associated with a handler has failed to be successfully received by third-party application system 140 based on one or more factors including, but not limited to: determining a handler status value has not be received from third-party application system 140 within a time threshold; receiving a handler status value update from third-party application system 140, and receiving a connection timeout indication corresponding to one or more handlers. In instances where process scheduler system 120 determines a transmission has failed, process scheduler system 120 may modify a corresponding handler status value to ready to retransmit data without a received status value from third-party application system 140.

In circumstances when a handler status value is retransmit, process scheduler system 120 may extract the same document segments from the handler's queue and write the extracted document segments into the corresponding handler for subsequent retransmission to third-party application system 140. In one embodiment, document segments added to a handler's queue stay in the handler's queue until process scheduler system 120 has received an indication that a handler has successfully completed a data transmission. By holding the document segments in a handler's queue it can allow process scheduler system 120 to retransmit document segments without having to reprocess the data (i.e. retrieve, format, and segment), which can increase the efficiency of process scheduler system 120.

In circumstances when process scheduler system 120 determines, using a corresponding handler status value, there are no handler's available, process scheduler system may take different actions. In one embodiment, process scheduler system 120 stops retrieving data from data source 110 (block 505), stops formatting data (blocks 510-515) and/or stops segmenting data (block 525.) By stopping one or more of these processes, process scheduler system 120 can efficiently use computing resources. In some embodiments, process scheduler system 120 will continuously retrieve data from data source 110, format data, and segment the formatted data. However, it may not be efficient to utilize computational resources of process scheduler system 120 to retrieve data, format data, and/or segment formatted data if there are no handler queues available to store the document segments.

When it is determined that the document segment(s) do not contain one or more attachments, process 500 proceeds to block 565. At block 565, process scheduler system 120, groups together document segments without attachments. Process scheduler system 120 can group together document segments by associating a transmission type identifier with the document segments. In this instance, the transmission type identifier is set to an indirect transfer value.

At block 570, process scheduler system 120 queries internal storage to locate a flag value. The flag value may be a binary value that indicates to process scheduler system 120 to change all transmission type identifiers to the direct transfer value. For example, the flag may be a Full Direct Transfer Flag (FDT) flag. The FDT flag value may be set based on one or more factors including, but not limited to: availability of integration system 130, connection speed of connection 125, processing queue of integration system 130, maximum capacity of each handler, and availability of handlers. For example, the FDT flag value may be 1 as long as there are one or more available handlers. If the FDT flag value is equal to 1 then process scheduler system 120 can set all transmission type identifiers associated with all document segments to a direct transfer value. In such an instance, document segments can be processed according to operations associated with blocks 545-560. If the FDT flag value is equal to 0 then process scheduler system 120 may not modify the transmission type identifiers set at block 565 and process 500 moves to block 575.

At block 575, for document segments that have a transmission type identifier equal to an indirect transfer value, process scheduler system 120 transfers at least one document segment to integration system 130 for subsequent transfer to third-party application system 140. In such an instance, integration system 130 can receive one or more document segments from process scheduler system 120 and can transfer the one or more document segments to third-party application system 140. Operations related to blocks 575 and 560 may be performed concurrently, simultaneously, and/or continuously in parallel. As a result, separate document segments may be simultaneously sent to third-party application system 140 directly and indirectly.

In accordance with one or more embodiments of this disclosure, document segments with attachments may be sent to third-party application system 140 via direct transfer, and document segments without attachments may be sent to third-party application system 140 via indirect transfer (i.e. via integration system 130.) A dual communication path for data transmission can be advantageous because it can enable process scheduler system 120 to implement a direct transfer process to send larger document segments using a first communication path and send smaller document segments using a second communication path. Blocks 535-560 may require more than an insignificant amount of computation power. By omitting one or more blocks 535-560 for documents without an attachment, process scheduler system 120 can commit more computing resources to processing larger datasets. Document segments without attachments (i.e. text only documents) are typically smaller in size (e.g., less than 10 MB) and thus can be easily sent by integration system 130 to third-party application system 140. However, documents with attachments are typically larger in size (e.g., greater than 10 MB) and thus can require more substantial resources to be sent by integration system 130 to third-party application system 140. When integration system 130 sends datasets to third-party application system 140 it uses system resources. However, these system resources may be better suited for handling operation request as described below. Using the system resources of integration system 130 to transfer large files (e.g., greater than 10 MB) may stymie its ability to process an operation request creating a bottleneck. Thus, can be advantageous to have a first communication path to send larger datasets (e.g., greater than 10 MB) and a second communication path to send smaller datasets (e.g., 10 MB or less.)

Utilizing process 500, third-party application system 140 can populate one or more internal data stores based on the received documents segments. By populating one or more data stores with the received document segments, third-party application system 140 may apply business logic to data internal to sub-network 160 without being internal to sub-network 160. For example, third-party application system 140 may build a search engine index based on the received document segments. The search engine index may comprise search definitions based on data from data source 110. In this embodiment, third-party application system may perform data-store-based operations such as crawling for updates, maintaining indexes, and servicing user search requests.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed:

1. A computer-implemented method comprising:
accessing, by a process scheduler system, data from a data source;
instantiating a plurality of handlers, each handler of the plurality of handlers being configured to facilitate data transfers between devices;
segmenting, by the process scheduler system, the data into a plurality of data segments;
for each handler of the plurality of handlers:
adding multiple data segment of the plurality of data segments to a queue for the handler; and
initiating writing of the multiple data segments from the handler to a search engine server;
receiving, by an integration system, a search query from a web server;
encoding, by the integration system, data in the search query to produce an encoded search request;
transmitting, from the integration system to the search engine server, the encoded search request;
receiving, by the integration system, a search result from the search engine server; and
transmitting, by the integration system, the search result to the web server.

2. The computer-implemented method of claim 1, wherein the plurality of data segments are configured to be input into a search engine index.

3. The computer-implemented method of claim 1, further comprising:
receiving, by the search engine server, the plurality of data segments;

generating, by the search engine server, based on the plurality of data segments, a search engine index;

generating, by the search engine server, based on data in the search engine index, the search result; and transmitting, from the search engine server to the integration system, the search result.

4. The computer-implemented method of claim 1, further comprising:

continuing the writing of the plurality of data segments in an asynchronous manner by, for each handler of at least two of the plurality of handlers:

detecting that the handler of the plurality of handlers is available to receive data;

in response to the detection, adding another at least one data segment of the plurality of data segments to the queue for the handler, wherein the adding is performed at different times for at least two of the plurality of handlers; and initiating writing of the other at least one data segment from the handler to the search engine server in accordance with the queue.

5. The computer-implemented method of claim 1, further comprising, prior to the initiation of writing the multiple data segments:

determining a quantity of the plurality of handlers for which the adding the multiple data segments is complete; and determining whether the quantity of the plurality of handlers exceeds a predefined handler sending threshold, wherein the writing of the multiple data segments is initiated upon determining that the quantity of the plurality of handlers exceeds the predefined handler sending threshold.

6. The computer-implemented method of claim 1, wherein, in response to detecting that one or more handler of the plurality of handlers is available to receive data:

segmenting, by the process scheduler, the data into the plurality of data segments.

7. The computer-implemented method of claim 1, further comprising:

scanning, by the process scheduler system, a data segment of the plurality of data segments to determine if the data segment is associated with an attachment; and in response to determining the scanned data segment is not associated with an attachment:

transmitting, from the process scheduler system to the integration system, the data segment; and transmitting, from the integration system to the search engine server, the data segment.

8. The computer-implemented method of claim 1, further comprising scanning, by the process scheduler system, a data segment of the plurality of data segments to determine if the data segment is associated with an attachment; and in response to determining the scanned data segment is associated with an attachment:

receiving, by the process scheduler system, the attachment; and encoding, using a base64 encoding scheme, the attachment to produce an encoded attachment, the encoded attachment being a part of the data segment.

9. The computer-implemented method of claim 1, further comprising:

scanning, by the process scheduler system, a data segment of the plurality of data segments to determine if the data segment is associated with an attachment;

in response to determining the scanned data segment is not associated with an attachment:

transmitting, from the process scheduler system to the integration system, the data segment; and transmitting, from the integration system to the search engine server, the data segment; and in response to determining the scanned data segment is associated with an attachment:

receiving, by the process scheduler system, the attachment; and encoding, using a base64 encoding scheme, the attachment to produce an encoded attachment, the encoded attachment being a part of the data segment.

10. The computer-implemented method of claim 1, further comprising:

encoding, using Java Script Object Notation (JSON), data in at least one data segment of the plurality of data segments to produce a JSON document, the JSON document being a part of the at least one data segment.

11. A system comprising:

a process scheduler system, the process scheduler system comprising one or more processors and a non-transitory computer-readable medium containing instructions that, when executed by the one or more processors, cause the process scheduler system to perform operations including:

accessing, data from a data source;

instantiating a plurality of handlers, each handler of the plurality of handlers being configured to facilitate data transfers between devices;

segmenting, the data into a plurality of data segments;

for each handler of the plurality of handlers:

adding multiple data segment of the plurality of data segments to a queue for the handler; and initiating writing of the multiple data segments from the handler to a search engine server; and an integration system, the integration system comprising one or more processors and a non-transitory computer-readable medium containing instructions that, when executed by the one or more processors, cause the integration system to perform operations including:

receiving, a search query from a web server;

encoding, data in the search query to produce an encoded search request;

transmitting, to the search engine server, the encoded search request;

receiving a search result; and transmitting, the search result to the web server.

12. The system of claim 11, wherein the plurality of data segments are configured to be input into a search engine index.

13. The system of claim 11, further comprising:

the search engine server, the search engine server comprising one or more processors and a non-transitory computer-readable medium containing instructions that, when executed by the one or more processors, cause the search engine server to perform operations including:

receiving, the plurality of data segments;

generating, based on the plurality of data segments, a search engine index;

generating, based on data in the search engine index, the search result; and transmitting, to the integration system, the search result.

14. The system of claim 11, the process scheduler system operations further including:

continuing the writing of the plurality of data segments in an asynchronous manner by, for each handler of at least two of the plurality of handlers:
  detecting that the handler of the plurality of handlers is available to receive data;
  in response to the detection, adding another at least one data segment of the plurality of data segments to the queue for the handler, wherein the adding is performed at different times for at least two of the plurality of handlers; and
  initiating writing of the other at least one data segment from the handler to the search engine server in accordance with the queue.

15. The system of claim 11, the process scheduler system operations further including:
  prior to the initiation of writing the multiple data segments:
    determining a quantity of the plurality of handlers for which the multiple data segments is complete; and
    determining whether the quantity of the plurality of handlers exceeds a predefined handler sending threshold, wherein the writing of the multiple data segments is initiated upon determining that the quantity of the plurality of handlers exceeds the predefined handler sending threshold.

16. The system of claim 11, The process scheduler system operations further including:
  in response to detecting that one or more handler of the plurality of handlers is available to receive data:
    segmenting, the data into the plurality of data segments.

17. The system of claim 11, the process scheduler system operations further including:
  scanning, a data segment of the plurality of data segments to determine if the data segment is associated with an attachment; and
  in response to determining the scanned data segment is not associated with an attachment:
    transmitting, to the integration system, the data segment; and
    the integration system operations further including:
      transmitting, to the search engine server, the data segment.

18. The system of claim 11, the process scheduler system operations further including:
  scanning, a data segment of the plurality of data segments to determine if the data segment is associated with an attachment; and
  in response to determining the scanned data segment is associated with an attachment:
    receiving, the attachment; and
    encoding, using a base64 encoding scheme, the attachment to produce an encoded attachment, the encoded attachment being a part of the data segment.

19. The system of claim 11, the process scheduler system operations further including:
  scanning, a data segment of the plurality of data segments to determine if the data segment is associated with an attachment;
  in response to determining the scanned data segment is not associated with an attachment:
    transmitting, to the integration system, the data segment; and
    the integration system operations further including:
      transmitting, from the integration system to the search engine server, the data segment; and
  in response to determining the scanned data segment is associated with an attachment:
    receiving, by the process scheduler system, the attachment; and
    encoding, using a base64 encoding scheme, the attachment to produce an encoded attachment, the encoded attachment being a part of the data segment.

20. The system of claim 11, the process scheduler system operations further including:
  encoding, using Java Script Object Notation (JSON), data in at least one data segment of the plurality of data segments to produce a JSON document, the JSON document being a part of the at least one data segment.

* * * * *

UNITED STATES PATENT AND TRADEMARK OFFICE
CERTIFICATE OF CORRECTION

PATENT NO. : 10,623,523 B2
APPLICATION NO. : 15/983831
DATED : April 14, 2020
INVENTOR(S) : Sahoo et al.

It is certified that error appears in the above-identified patent and that said Letters Patent is hereby corrected as shown below:

In the Claims

Column 25, Line 26, Claim 16, delete "The" and insert -- the --, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*